United States Patent [19]

Kishi

[11] Patent Number: 5,238,393
[45] Date of Patent: Aug. 24, 1993

[54] MULTI-CAVITY INJECTION MOLDING APPARATUS FOR OPTICAL DISK SUBSTRATES

[75] Inventor: Shinsuke Kishi, Saitama, Japan
[73] Assignee: Sony Corporation, Tokyo, Japan
[21] Appl. No.: 816,393
[22] Filed: Dec. 27, 1991

[30] Foreign Application Priority Data

Dec. 28, 1990 [JP] Japan .................. 417125

[51] Int. Cl.$^5$ ........................... B29C 45/38
[52] U.S. Cl. .................... 425/572; 264/106; 264/155; 264/161; 264/297.2; 264/328.8; 425/577; 425/810
[58] Field of Search .......... 425/572, 810, 556, 577, 425/588, 553; 264/106, 107, 297.2, 328.8, 154, 155, 161, 1.3

[56] References Cited

U.S. PATENT DOCUMENTS

| | | | |
|---|---|---|---|
| 3,568,256 | 3/1971 | Johnson, Jr. | 425/191 |
| 4,121,740 | 10/1978 | Gabrys | 425/549 |
| 4,917,833 | 4/1990 | Cools | 425/810 |
| 4,971,548 | 11/1990 | Asai | 425/810 |
| 5,069,840 | 12/1991 | Arnott | 425/572 |

FOREIGN PATENT DOCUMENTS

| | | |
|---|---|---|
| 0177991 | 4/1986 | European Pat. Off. . |
| 0244783 | 11/1987 | European Pat. Off. . |
| 3105700 | 11/1981 | Fed. Rep. of Germany . |
| 59-230731 | 12/1984 | Japan . |
| 60-220720 | 11/1985 | Japan . |
| 61-100426 | 5/1986 | Japan . |

*Primary Examiner*—Tim Heitbrink
*Attorney, Agent, or Firm*—Hill, Steadman & Simpson

[57] ABSTRACT

A multi-cavity injection molding apparatus capable of simultaneously molding a plurality of optical disk substrates with a simple construction. The injection molding apparatus is constituted of a mold unit having a plurality of cavities and an injection unit for supplying a molten resin to the mold unit. The injection unit is provided with a plurality of nozzles for injecting the molten resin into the cavities, respectively.

7 Claims, 1 Drawing Sheet

MULTI-CAVITY INJECTION MOLDING APPARATUS FOR OPTICAL DISK SUBSTRATES

BACKGROUND OF THE INVENTION

The present invention relates to a multi-cavity injection molding apparatus for optical disk substrates such as compact disks having recorded information by pits or magneto-optical disks from which recorded information is read by utilizing optical characteristics, magneto-optical interaction, etc.

In general, an optical disk substrate normally formed of transparent resin has a central hole 1 as shown in FIG. 2 regardless of the case that the substrate has an uneven surface by pits or it has a smooth surface without pits. The central hole 1 is adapted to be mounted to a rotary driving portion in an optical disk drive. It is required that the substrate surface around the central hole 1 is uniform in optical characteristics such as an index of double refraction. Therefore, in molding the optical disk substrate, it is obliged to provide an injection opening for injecting resin into a cavity of a mold at a position corresponding to the center of the optical disk substrate where the central hole thereof is to be formed. That is, it is necessary that the mold for the optical disk substrate is provided with a sprue for injecting the resin into every cavity.

The optical disk substrate is molded normally one by one by using an injection molding apparatus. However, such an injection molding apparatus for molding the optical disk substrate one by one is disadvantageous in mass productivity.

To solve this problem, it has been attempted to manufacture or employ an injection molding apparatus capable of simultaneously molding a plurality of optical disk substrates.

Such a multi-cavity injection molding apparatus is generally constituted of a mold unit having a plurality of cavities for molding the optical disk substrates and an injection unit for supplying a molten resin to the mold unit. The mold unit is provided with a plurality of resin feeding passages respectively communicating with the plural cavities or respectively connected to a plurality of sprues corresponding to the plural cavities.

In this kind of injection molding apparatus, it is necessary to carry out resin purging in order to eliminate a possibility that the molten resin may be decomposed in several hours after stopping operation of the apparatus. However, in the above construction of the injection molding apparatus, the resin purging is difficult, rendering the maintenance of the apparatus troublesome.

As another attempt in such a multi-cavity injection molding apparatus, the injection unit for supplying the molten resin to the mold unit is provided with a plurality of resin supplying sections or screw mechanisms for respectively supplying the molten resin under pressure to the plural sprues in the mold unit. However, as the plural screw mechanisms are provided, special design and manufacture of the injection molding apparatus are required to cause an increase in cost.

SUMMARY OF THE INVENTION

It is an object of the present invention to provide a multi-cavity injection molding apparatus for optical disk substrates which has a simple construction.

It is another object of the present invention to provide a multi-cavity injection molding apparatus for optical disk substrates which can easily carry out the maintenance such as resin purging.

It is another object of the present invention to provide a multi-cavity injection molding apparatus for optical disk substrates which can simultaneously mold a plurality of optical disk substrates to improve a mass productivity.

According to the present invention, there is provided an injection molding apparatus comprising a mold unit defining a plurality of cavities for simultaneously molding a plurality of optical disk substrates, said mold unit comprising a plurality of sprue bushes corresponding to said cavities, each of said sprue bushes having a sprue opening into a central portion of said corresponding cavity, a plurality of punches provided in opposition to said sprue bushes with respect to said cavities for penetrating central portions of said optical disk substrates after being molded and urging said sprue bushes to form central holes through said optical disk substrates, a plurality of locating rings corresponding to said sprue bushes for limiting movement of said sprue bushes to be urged by said punches to a predetermined fine value, and a platen having a plurality of receiving holes for respectively receiving said locating rings; and an injection unit comprising a single resin supplying section for supplying a molten resin to said mold unit and a plurality of nozzles for injecting said molten resin supplied from said resin supplying section under pressure through said sprues into said cavities, respectively.

With this arrangement, a plurality of optical disk substrates are simultaneously injection molded by the mold unit having the plural cavities, thus improving a mass productivity.

The plural nozzles corresponding to the plural cavities in the mold unit are provided in the injection unit for supplying a molten resin. Accordingly, as compared with the case where the nozzles are provided in the mold unit, the structure and the construction of the injection molding apparatus can be simplified to thereby realize cost reduction and easy maintenance such as resin purging.

Further, the resin supplying section is singularly provided in the injection unit, and it is connected through a plurality of branched resin feeding passages to the plural nozzles. Accordingly, an increase in cost can be suppressed.

Other objects and features of the invention will be more fully understood from the following detailed description and appended claims when taken with the accompanying drawings.

DETAILED DESCRIPTION OF THE PREFERRED EMBODIMENT

Figure 1:
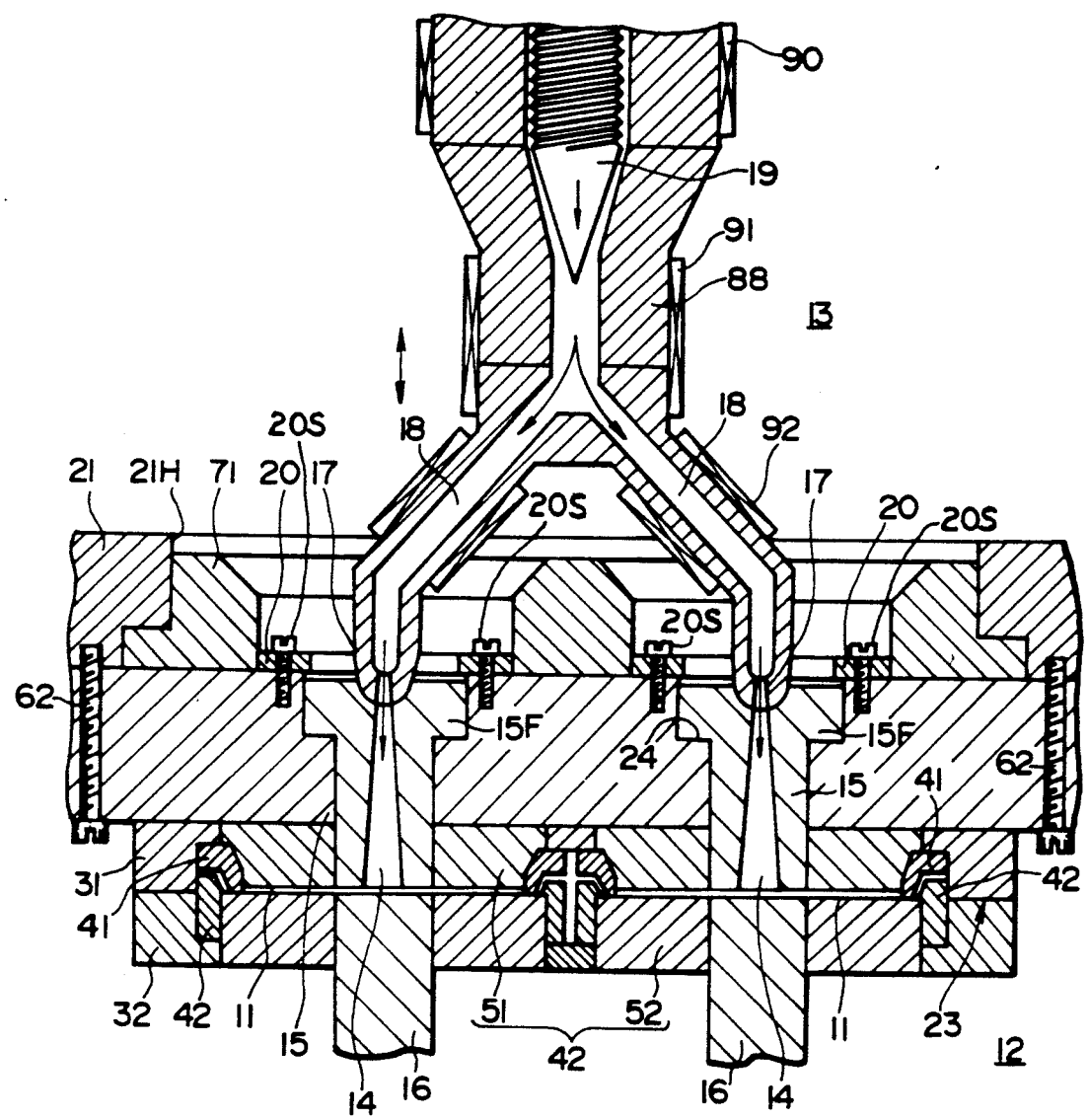
FIG. 1 is a schematic vertical sectional view of a preferred embodiment of the injection molding apparatus according to the present invention.

A preferred embodiment of the injection molding apparatus according to the present invention will now be described with reference to FIG. 1. The injection molding apparatus shown in FIG. 1 is of a vertical construction such that two optical disk substrates are molded in every molding cycle.

Reference numeral 12 generally designates a mold unit which is constituted of two sets of fixed molds 51 and movable molds 52. Each fixed mold 51 is held by a holding ring 41 which is fixedly inserted in a through hole 31H formed through a side plate 31. Similarly, each movable mold 52 is held by a holding ring 42 which is fixedly inserted in a through hole 32H formed through a side plate 32. There are defined two disk-shaped cavities 11 by the two sets of the fixed molds 51 and the movable molds 52. Reference numeral 23 designates a separating surface or a parting surface of the mold unit 12.

A mounting plate 50 is provided to mount the fixed molds 51 together with the side plate 31. The mounting plate 50 is formed with two through holes 50H, and the fixed molds 51 are respectively formed with two central through holes 51H which are respectively aligned to the two through holes 50H of the mounting plate 50. Two sprue bushes 15 are vertically movably inserted in the two through holes 50H of the mounting plate 50 and the two central through holes 51H of the fixed molds 51, respectively. Each sprue bush 15 is axially central formed with a sprue 14 opening at its lower end into the corresponding cavity 11 at a central position thereof. Each through hole 50H of the mounting plate 50 is widened at its upper end in diameter to form a recess 24, and each sprue bush 15 is correspondingly widened at its upper end in diameter to form a flange 15F. The flange 15F of each sprue bush 15 is received in the corresponding recess 24 so as to normally abut against a bottom surface of the recess 24. In this condition, a lower end of each sprue bush 15 is flush with an upper surface of the corresponding cavity 11.

Two locating rings 20 are fixed by screws 20S to an upper surface of the mounting plate 50 along the outer circumferences of the respective recesses 24 of the mounting plate 50 so that an upper surface of the flange 15F of each sprue bush 15 may abut against a lower surface of the corresponding locating ring 20 when the sprue bush 15 is lifted. Thus, a fine spacing 25 is normally defined between the upper surface of the flange 15F of each sprue bush 15 and the lower surface of the corresponding locating ring 20, and when each sprue bush 15 is lifted by a distance equal to the fine spacing 25, the upper surface of the flange 15F of each sprue bush 15 comes into abutment against the lower surface of the corresponding locating ring 20, so that fine vertical movement of each sprue bush 15 corresponding to the fine spacing 25 is permitted, and escape of each sprue bush 15 from the corresponding recess 24 is prevented by the corresponding locating ring 20.

A platen 21 is fixed by screws 62 to the mounting plate 50. The platen 21 is formed with a nest locating hole 21H, and a nest 71 is fixedly located in the nest locating hole 21H. The nest 71 is formed with two receiving holes 71H for respectively receiving the two locating rings 20. Each locating ring 20 is fixedly received in the corresponding receiving hole 71H.

Reference numeral 13 generally designates an injection unit which is constituted of a resin supplying section 19, a branched section 86 having two resin feeding passages 18, and an intermediate connecting section 88 for connecting the branched section 86 to the resin supplying section 19. The branched section 86 is provided at its formed ends with two nozzles 17 respectively communicating with the two resin feeding passages 18 and opening into the upper ends of the sprues 14. Each nozzle 17 is so located as to abut against the upper end of the corresponding sprue bush 15 and urge the same so that the lower end of each sprue 14 may become flush with the upper surfaces of the corresponding cavity 11. The resin supplying section 19 is constructed of a screw mechanism, and although not shown, a resin pellet such as polycarbonate or acrylic resin is supplied to the resin supplying section 19. The resin pellet thus supplied is molten by heating means 90 such as an electrical heater, and is agitated by rotation of the screw mechanism. The molten resin is supplied from the resin supplying section 19 by lowering the screw mechanism under hydraulic pressure, for example, and is fed through the intermediate connecting section 88 to the branched section 86. Then, the flow of the molten resin is branched into the two resin feeding passages 18, and is injected from the nozzles 17 through the sprues 14 into the cavities 11. Heating means 91 such as an electrical heater is provided on an outer circumference of the intermediate connecting section 88, and heating means 92 such as an electrical heater are also provided on outer circumferences of the formed portions of the branched section 86, so as to prevent solidification of the molten resin.

Each movable mold 52 is formed with a central through hole 52H aligned to the central through hole 51H of the corresponding fixed mold 51. Two punches 16 are vertically movably inserted in the central through holes 52H of the movable molds 52, respectively. Each punch 16 is aligned to the corresponding sprue bush 15, and has a diameter equal to an outer diameter of the corresponding sprue bush 15. In molding the resin in each cavity 11, an upper end surface of the corresponding punch 16 is flush with a lower surface of the cavity 11.

In this way, the resin is injected and charged into the cavities 11 to simultaneously form two disk-shaped optical disk substrates.

Figure 2:
FIG. 2 is a vertical sectional view of an optical disk substrate to be molded by the injection molding apparatus shown in FIG. 1.

After the molding step, the injection unit 13 is upwardly retracted to permit the fine vertical movement of the sprue bushes 15. In this condition, each punch 16 is lifted to form a central hole through the optical disk substrate molded in the corresponding cavity 11. At this time, each sprue bush 15 is upwardly urged by the upper end surface of the corresponding punch 16 in the predetermined spacing 25 until the upper surface of the flange 15F of the sprue bush 15 comes into abutment against the lower surface of the corresponding locating ring 20. Accordingly, an upper end portion of each punch 16 can penetrate the central portion of the corresponding optical disk substrate over an entire thickness thereof. Thus, a central hole 1 as shown in FIG. 2 can be satisfactorily formed through each optical disk substrate.

Although the injection molding apparatus described above is of a vertical construction and of a dual-cavity type, various changes and modifications may be made without departing from the scope of the present invention. For example, the injection molding apparatus may be of a horizontal construction, or may be of a multi-cavity type having three or more cavities.

As described above, the injection molding apparatus is so constructed as to mold a plurality of optical disk substrates in every molding cycle, thereby improving a mass productivity of the optical disk substrates.

Further, the nozzles 17 corresponding to the plural cavities 11 are provided in the injection unit 13, and they are formed as a part of the branched section 86 replaceably connected to the single resin supplying section 19. Accordingly, selection of single-cavity molding or multi-cavity molding may be attained by merely replacing the branched section 86 having the nozzles 17. In addition, since the nozzles 17 are provided in the injection unit 13 rather than the mold unit 12, the resin purging can be easily carried out.

Irrespective of whether the single-cavity molding or the multi-cavity molding is to be carried out, the platen 21 may be commonly used, and it is only necessary to replace the nest 71 in accordance with the number of the cavities 11 as well as the replacement of the branched section 86. Accordingly, compatibility and cost reduction of the injection molding apparatus can be achieved.

While the invention has been described with reference to a specific embodiment, the description is illustrative and is not to be construed as limiting the scope of the invention. Various modifications and changes may occur to those skilled in the art without departing from the spirit and scope of the invention as defined by the appended claims.

What is claimed is:

1. An injection molding apparatus comprising:
   a mold unit defining a plurality of cavities for simultaneously molding a plurality of optical disk substrates, said mold unit comprising a plurality of sprue bushes, each sprue bush having a sprue opening into a central portion of a corresponding one of said cavities, a plurality of punches provided in opposition to said sprue bushes with respect to said cavities for penetrating central portions of said optical disk substrates after said optical disk substrates are molded to form central holes through said optical disk substrates, said punches urging said sprue bushes away from said substrates, a plurality of locating rings corresponding to said sprue bushes for limiting movement of said sprue bushes to be urged by said punches to a predetermined fine value, and a platen attached to said mold unit and having at least one receiving hole for respectively receiving said locating rings; and
   a retractable injection unit comprising a single resin supplying section for supplying a molten resin to said mold unit having a branched section providing cantilever resin delivery tubes and a plurality of nozzles each located at a free end of one said delivery tube, each of said nozzles extending into said receiving hole and abutting one of said sprue bushes, said nozzles for injecting said molten resin supplied from said resin supplying section under pressure through said sprues into said cavities, respectively.

2. The injection molding apparatus as defined in claim 1, wherein said mold unit further comprises a nest replaceably received in said one receiving hole of said platen, said nest having a plurality of ring receiving holes, each ring receiving hole for respectively receiving one of said locating rings.

3. The injection molding apparatus as defined in claim 1 further comprising means for heating said resin supplying section and said delivery tubes.

4. The injection molding apparatus as defined in claim 1, wherein said nozzles are replaceably connected to said resin supplying section.

5. An injection molding apparatus comprising:
   a fixed mold and a movable mold, engageable together to define a plurality of mold cavities therebetween;
   a mounting plate attached to said fixed mold on a side opposite said movable mold;
   said fixed mold having at each cavity a first through hole into said cavity, and said mounting plate having a second through hole axially aligned and open to said first through hole;
   said movable mold having at each cavity a third through hole axially aligned with said first and second through holes;
   a plurality of sprue bushes each sized and adapted to interfit reciprocally within one respective first and second through holes;
   a plurality of punches each sized and adapted to interfit reciprocally in one respective third through hole;
   each said sprue bush having an axial channel for flow communicating into one respective cavity;
   each said punch extendable into one respective cavity for penetrating central portions of said optical disk substrates after molding within said cavity;
   a plurality of locating rings, one axially aligned at each second through hole, each said ring overlying an end of one respective sprue bush preventing said sprue bush from exiting said second through hole, said sprue bush sized to have slightly less length than a distance between said ring and said cavity allowing a limited movement of said sprue bush within said first and second through holes;
   a platen having a central receiving hole mounted to said mounting plate, said central receiving hole circumscribing said rings;
   a nest interfit within said central receiving hole and having a plurality of ring receiving holes, each ring receiving hole axially aligned with one of said rings; and
   a retractable injection unit having a plurality of resin delivery nozzles extendable into said ring receiving holes to abut said sprue bushes, said nozzles in flow communication with said axial channels.

6. The injection molding apparatus according to claim 5, wherein said injection unit comprises a single resin supply section having a branched section providing cantilever resin delivery tubes, each delivery tube holding one of said nozzles at a terminal end thereof, said nozzles abutting said sprue bushes through said rings.

7. The injection molding apparatus as defined in claim 6 further comprising means for heating said resin supplying section and said delivery tubes.

* * * * *